(12) United States Patent
Wood

(10) Patent No.: US 7,753,666 B2
(45) Date of Patent: Jul. 13, 2010

(54) APPARATUS AND METHOD FOR COOLING PLASTIC FILM TUBE IN BLOWN FILM PROCESS

(75) Inventor: Gregory James Wood, Carrollton, TX (US)

(73) Assignee: Poly-America, L.P., Grand Prairie, TX (US)

( * ) Notice: Subject to any disclaimer, the term of this patent is extended or adjusted under 35 U.S.C. 154(b) by 867 days.

(21) Appl. No.: 11/451,984

(22) Filed: Jun. 12, 2006

(65) Prior Publication Data

US 2007/0284790 A1    Dec. 13, 2007

(51) Int. Cl.
*B29C 47/88* (2006.01)
(52) U.S. Cl. .................. 425/72.1; 425/378.1; 264/488; 264/565
(58) Field of Classification Search .............. 264/558, 264/565; 425/72.1, 378.1, 326.1
See application file for complete search history.

(56) References Cited

U.S. PATENT DOCUMENTS

| | | | |
|---|---|---|---|
| 3,170,011 A * | 2/1965 | Grant et al. ................. | 264/564 |
| 4,115,048 A | 9/1978 | Alderfer et al. | |
| 4,138,453 A | 2/1979 | Segl, Jr. | |
| 4,315,963 A * | 2/1982 | Havens ...................... | 428/35.2 |
| 4,846,645 A * | 7/1989 | Cole .......................... | 425/72.1 |
| 6,068,462 A * | 5/2000 | Wybenga ................... | 425/72.1 |
| 2005/0067743 A1 | 3/2005 | Hatfield | |

* cited by examiner

*Primary Examiner*—Richard Crispino
*Assistant Examiner*—Martin Rogers

(57) ABSTRACT

An apparatus and method for cooling a molten plastic film tube exiting the outlet of an extrusion die is disclosed. The apparatus includes an inlet passage adapted to direct cooling air through the extrusion die to the interior of the plastic film tube. The apparatus includes at least one air dispensing device coupled to the inlet passage. The air dispensing device is configured to receive the cooling air and to direct a flow of the cooling air out of the air dispensing device in an approximately circumferential or tangential direction. The circumferential or tangential flow of the inlet air inside the plastic film tube cools the molten tube while reducing impact on the molten tube.

14 Claims, 5 Drawing Sheets

APPARATUS AND METHOD FOR COOLING PLASTIC FILM TUBE IN BLOWN FILM PROCESS

This invention relates generally to an apparatus and method for cooling a plastic film tube. More particularly, this invention relates to an apparatus and method for cooling a molten plastic film tube exiting the outlet of an extrusion die in a blown film process.

BACKGROUND OF THE INVENTION

Plastic film is generally produced by extruding plastic material such as polyethylene resin in a process known as the "blown film process." FIG. 1 illustrates a system 100 for producing plastic film utilizing the blown film process. Polyethylene resin, in the form of pellets, is fed into a hopper 104 of an extruder 108. The pellets are heated in the extruder 108 until they are molten. The molten material is fed under pressure into an extrusion die 112 having an annular outlet 116. As the molten material is extruded from the extrusion die 112, a plastic film tube or bubble 120 emerges. The terms "tube" and "bubble" are used interchangeably hereinafter.

The plastic film tube 120 is blown or expanded to a larger diameter by feeding air into its interior, thereby forming a thin film. By controlling the air pressure in the interior of the plastic film tube 120, the cooling rate of an air ring 132, the speed of an upper nip 122, and amount of resin extruded from the extrusion die 112, the plastic film tube 120 is blown to a desired thickness.

The plastic film tube 120 solidifies from a molten mass to a solid as it expands to its final diameter and travels in a vertically extending tube path. The lower portion of the plastic film tube 120 below the line 124 is molten while the upper portion of the plastic film tube 120 above the line 124 is solidified. The plastic film tube 120 travels within a bubble cage or frame 128 as it travels in a vertically extending tube path.

The plastic film tube 120 is generally cooled externally by one or more external air rings 132 that surround the tube. The air rings 132 direct a flow of cooling air onto the outer surface of the plastic film tube 120.

The plastic film tube 120 is additionally cooled internally by an internal bubble cooling (IBC) assembly 136. The IBC assembly 136 is configured to direct cool inlet air onto the inner surface of the plastic film tube 120. The IBC assembly 136 is coupled to an air inlet passage 140, which carries cool inlet air (i.e., cooling air) to the interior of the plastic film tube 120 through the extrusion die 112. Heated air from the interior of the plastic film tube 120 is collected by an exhaust air shaft 144, and the heated exhaust air is removed by an outlet passage 148 coupled to the exhaust air shaft 144.

The cooling of the plastic film tube 120 is a critical factor in the production of plastic film from plastic materials such as from polyethylene resin. The cooling rate influences the production capacity and the film properties. A controlled high cooling rate allows a high extrusion rate, resulting in increased plastic film production while maintaining desired film properties.

FIG. 2 illustrates a cross section of an apparatus 200 for producing plastic film tube in a blown film process. The apparatus includes an IBC assembly 204 having a plurality of air dispensing devices 208 stacked on top of an extrusion die 212. The air dispensing devices 208 include slits 216 for directing cooling air onto the inner surface of a plastic film tube 220. As shown by the arrows, the cooling air out of the slits 216 is directed onto the inner surface of the plastic film tube 220. The angle from horizontal at which the cooling air impacts the plastic film tube depends on the geometry of the slits or slots 216 (horizontal, angled upwards, or angled downwards) and the angle of the plastic film tube from vertical. The cooling air flow impacts the plastic tube 220 as a two-axis air flow: the air flows initially radially out of the slots at an angle to the horizontal and then travels in a generally upward direction due to the upward motion of the tube 220 and suction of the exhaust shaft 228. The cooling air is carried to the interior of the plastic film tube 220 by an inlet passage 224. An exhaust shaft 228 collects heated exhaust air from the interior of the plastic film tube 220, and the exhaust air is removed via an outlet passage 232 coupled to the exhaust shaft 228.

The air dispensing devices 208 regulate the velocity, volume and the direction of the air directed onto the inner surface of the tube or bubble. Increasing the velocity or volume of the air directed onto the inner surface of the tube increases the rate of cooling, which allows increased production of the film. However, when air is directed with increased velocity or volume onto the inner surface, the tube is often cooled non-uniformly as certain areas of the tube receives more cooling air than other areas, which results in non-uniform film thickness. Also, directing air onto the inner surface of the plastic film tube 220 sometimes causes the plastic film tube 220 to become unstable, which may result in the collapse of the plastic film tube 220. If the plastic film tube 220 collapses, the process must be shut down in order to remove molten material from atop the extrusion die 212. Thus, the instability of the plastic film tube 220 caused by the direction of the air flow may result in inefficiency in the production of the plastic film tube 220.

Accordingly, there is a need for an apparatus and method for cooling the plastic film tube without causing instability. There is a need for an apparatus and method for cooling the plastic film tube uniformly, thus preventing non-uniform film thickness. There is a need for an apparatus and method for efficiently cooling the plastic film tube without the foregoing disadvantages.

SUMMARY OF THE INVENTION

The invention is directed to an apparatus and method for cooling a molten plastic film tube exiting the outlet of an extrusion die. The apparatus includes an inlet passage adapted to direct cooling air through the extrusion die to the interior of the plastic film tube. The apparatus includes at least one air dispensing device coupled to the inlet passage. The air dispensing device is configured to receive the cooling air and to direct a flow of the cooling air out of the air dispensing device in an approximately circumferential or tangential direction. The circumferential or tangential flow of the inlet air inside the plastic film tube cools the molten tube while reducing impact on the molten tube.

The air dispensing device includes a plurality of vents, slits, baffles or slots configured to direct the flow of cooling air in a circumferential or tangential direction about a longitudinal axis. The apparatus further includes an outlet passage adapted to remove exhaust air from the interior of the plastic film tube through the extrusion die. The apparatus further includes an air ring mounted in proximity to the extrusion die outlet surrounding the tube path. The air ring is adapted to direct an external flow of air to the exterior surface of the plastic film tube.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
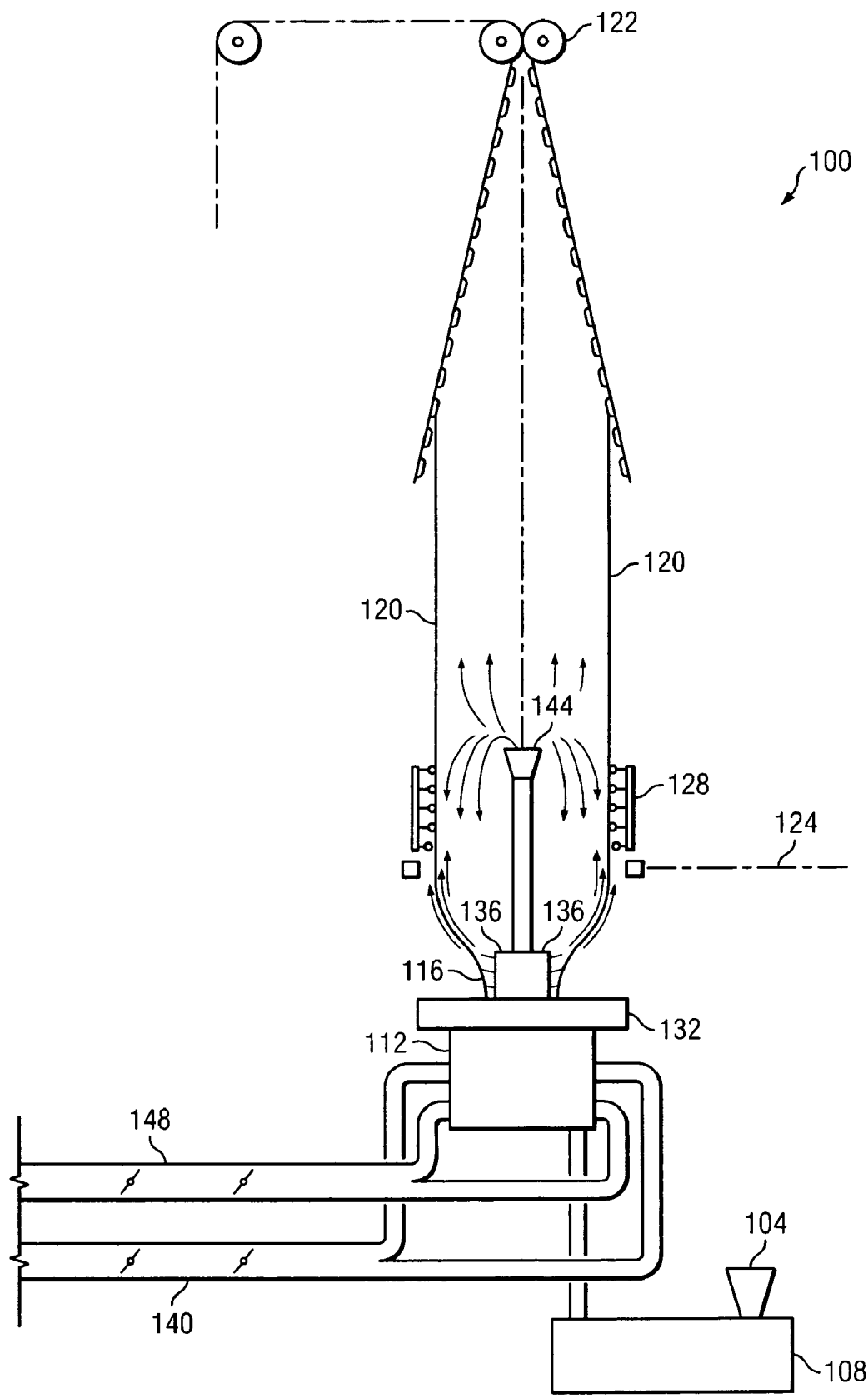
FIG. 1 illustrates a system for producing a plastic film tube utilizing a blown film process.
Figure 2:
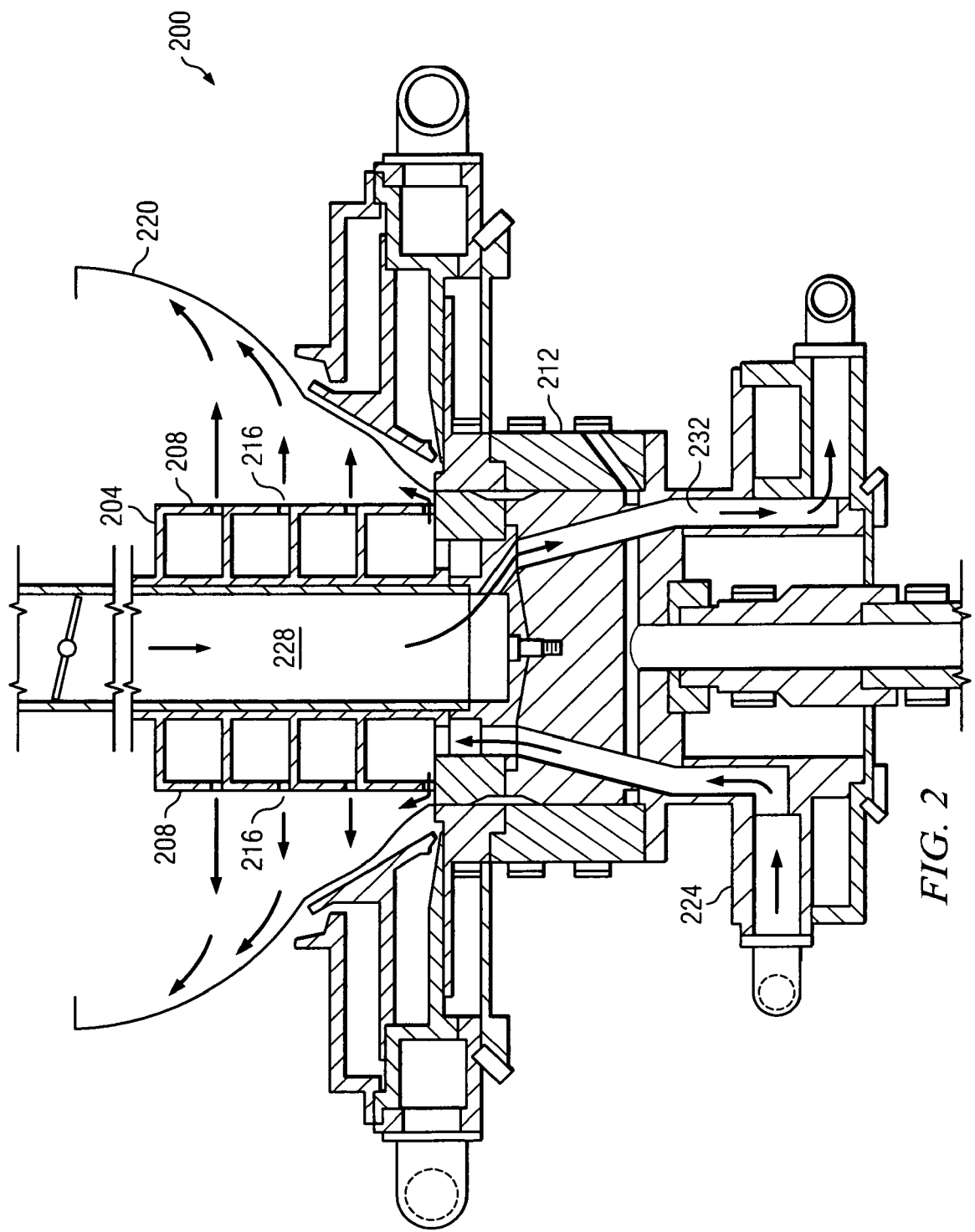
FIG. 2 illustrates a cross section of an apparatus for producing a plastic film tube.
Figure 3:
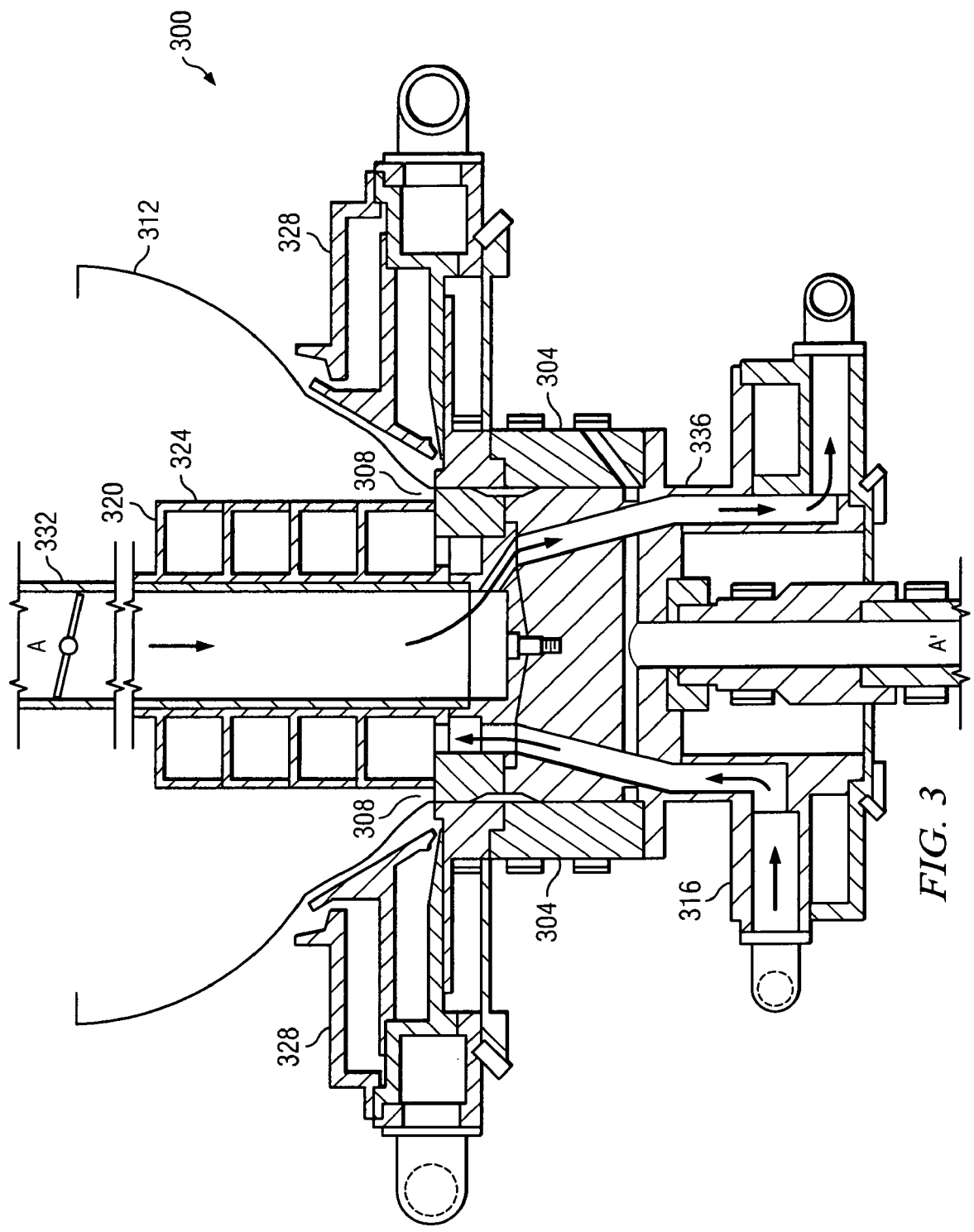
FIG. 3 illustrates a system for cooling a plastic film tube in accordance with one embodiment of the invention.

FIG. 3 illustrates a system 300 for cooling a plastic film in accordance with one embodiment of the invention. Molten resin (not shown in FIG. 3) is fed under pressure into an extrusion die 304 having an annular outlet 308. As the molten resin is extruded from the extrusion die 304, a plastic film tube or bubble 312 emerges from the annular outlet 308.

The plastic film tube 312 expands to its final diameter and moves vertically upward in a vertically extending tube path having a longitudinal axis A-A'. An inlet passage 316 is adapted to carry cooling air to the interior of the plastic film tube 312 through the extrusion die 304. An internal bubble cooling assembly 320 is mounted on the extrusion die 304. The cooling assembly 320 includes one or more air dispensing devices 324 coupled to an inlet passage 316. The air dispensing devices 324 are configured to receive the cooling air and to force or direct a three-axis air flow: radially at an angle from axis A-A', a generally upward direction due to the upward motion of the tube 312 and suction of the exhaust shaft 332, and flow of the cooling air in an approximately circumferential or tangential direction about the longitudinal axis A-A'. The angle from axis A-A' at which the cooling air impacts the plastic film depends on the geometry of the air dispensing devices 324 and the angle of the plastic tube 312 from axis A-A'. The purpose of forcing or directing an approximately circumferential flow of the cooling air inside the plastic film tube 312 is to generate an approximately rotating air flow in the interior of the plastic film 312. A rotating air flow in the interior of the plastic film tube 312 reduces direct impact on the plastic film tube 312. As will be understood by those skilled in the art, the direct impact on the plastic film tube 312 is reduced because the air flow is not forced or directed onto the inner surface of the plastic film tube 312, but is directed approximately circumferentially or tangentially to create an approximately rotating flow of air inside the plastic film tube 312. As a result of the reduction of impact on the inner surface of the plastic film tube 312, the instability of the plastic film tube 312 caused by the air flow directed onto the plastic film tube 312 is reduced. Consequently, the frequency of the collapse of the plastic film tube 312 is reduced, thereby increasing the efficiency of film production.

Furthermore, by forcing or directing the cooling air out of the air dispensing devices 324 in an approximately circumferential or tangential direction, the distortion of the shape of the plastic film tube 312 is reduced, which also reduces non-uniform film thickness. As discussed before, the distortion of the plastic film tube 312 is caused by the cooling air being forced or directed onto the inner surface of the plastic film tube 312, resulting in non-uniform film thickness. By forcing or directing the cooling air in a circumferential or tangential direction out of the air dispensing devices 324, a rotating flow of air is generated inside the plastic film tube 312, which reduces the distortion of the shape of the plastic film tube 312, thereby resulting in more uniform film thickness.

As will be understood by those skilled in the art, the molten plastic tube (i.e., lower portion of the tube 312) is cooled as the heat is transferred from the molten film tube to the cooling air adjacent to the molten plastic film. As the heat is transferred from the molten plastic tube, the adjacent cooling air is heated. The molten plastic tube is cooled at a higher rate as the heated air is mixed with cooling air at a higher rate.

When the cooling air is forced or directed in an approximately circumferential or tangential manner out of the air dispensing devices 324 resulting in an approximately rotational flow of air in the interior of the plastic film tube 312, the cooling air and the heated air inside the plastic film tube is mixed at a higher rate. The rotational flow of air in the interior of the plastic film tube 312 results in a higher rate of mixing between the cooling air and heated air inside the plastic film tube 312. Consequently, the molten plastic tube is cooled at a higher rate.

As discussed before, the cooling of the molten plastic film (i.e., plastic film tube 312) is a critical factor in the production of film from plastic materials such as from polyethylene resin. The cooling rate influences the production capacity. A high cooling rate allows a high extrusion rate, resulting in increased production of the plastic film tube 312. Since a rotational flow of air inside the plastic film tube 312 results in a higher cooling rate, the film production is increased.

The system 300 also includes one or more external air rings 328 that surround the molten tube. The air rings 328 direct a flow of cooling air onto the outer surface of the plastic film tube 312. Heated exhaust air inside the plastic film tube 312 is collected by an exhaust shaft 332 and is removed by an outlet passage 336 coupled to the exhaust shaft 332.

The air dispensing device 324 can be any device adapted to force or direct a flow of cooling air in an approximately circumferential or tangential direction. For example, the air dispensing device 324 can be an assembly that has a plurality of vents, slits, baffles or notches to direct or force cooling air out in an approximately circumferential or tangential direction to generate an approximately rotational flow of cooling air in the interior of the plastic tube.

Figure 4:
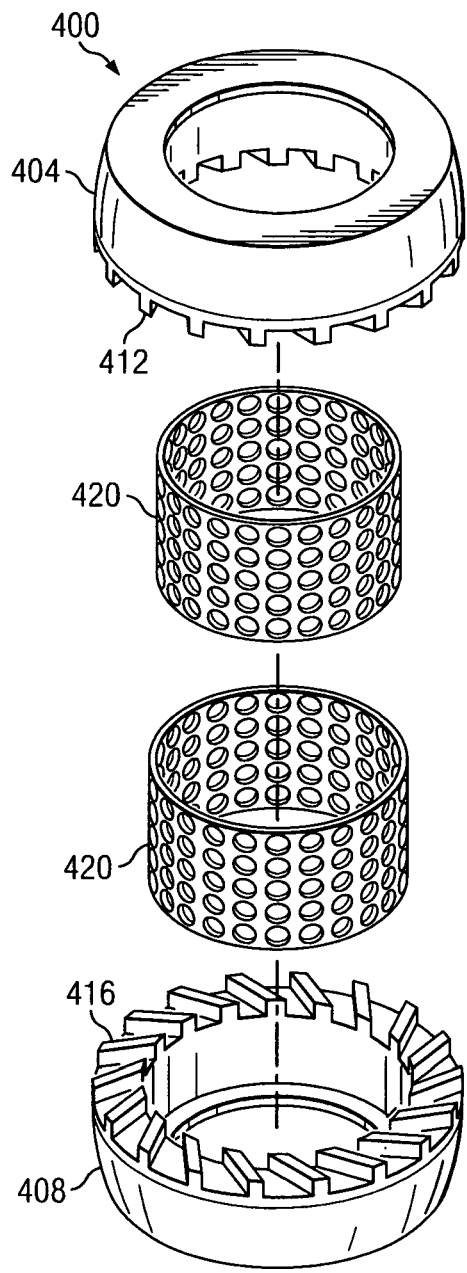
FIG. 4 is an exploded view of a ring-shaped air dispensing assembly in accordance with one embodiment of the invention.

FIG. 4 is an exploded view of a ring-shaped air dispensing assembly 400 for cooling a molten plastic film tube in accordance with one embodiment of the invention. The assembly 400 includes a top section 404 and a bottom section 408. The top section 404 includes a first set of teeth 412 and the bottom section 408 includes a second set of teeth 416. As shown in FIG. 4, the teeth 412 and 416 are formed at an angle suitable to direct a flow of air in an approximately circumferential or tangential direction. The air flowing in an approximately circumferential or tangential direction will flow across the external edge of teeth 412 and 416. The geometry of teeth 412 and 416 and the predetermined angle of teeth 412 and 416 are suitable to entrain air across the external edge of teeth 412 and 416, thereby preventing a periodic thickness variation in the film corresponding to the geometry of teeth 412 and 416.

The top and bottom sections 404 and 408 are sized to fit around an air shaft (shown in FIG. 3). The assembly 400 also includes one or more cylindrical intermediate sections 420 sized to fit around the air shaft and between the top and bottom sections 404 and 408. The intermediate sections 420 are sized to maintain a predetermined gap between the first and second sets of teeth 412 and 416. The intermediate sections 420 form an opening at the perimeter of the assembly 400 through which cooling air flows out. The intermediate sections 420 are adapted to receive cooling air via the inlet air passage (shown in FIG. 3). A plurality or openings or holes formed on the intermediate sections 420 allow the cooling air to flow out of the intermediate sections 420. The cooling air is then directed in an approximately circumferential or tangential direction by the first and second set of teeth 412 and 416 to create an approximately rotational flow of air inside the plastic film tube.

Figure 5A:
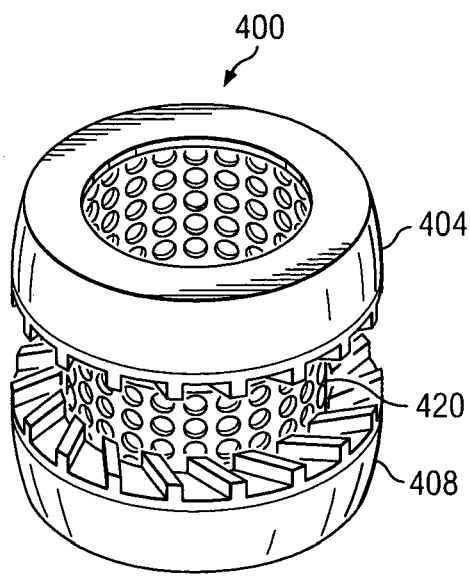
FIG. 5A is an oblique view of the air dispensing assembly in a closed position.

FIG. 5A is an oblique view of the air dispensing assembly 400 in closed position. As shown in FIG. 5A, the first and second sections 404 and 408, respectively, are spaced by the intermediate section 420. The assembly 400 is designed to fit around a shaft adapted to carry cooling air and to collect exhaust heated air. In one embodiment, a plurality of assemblies 400 may be stacked vertically and fitted around a shaft.

Figure 5B:
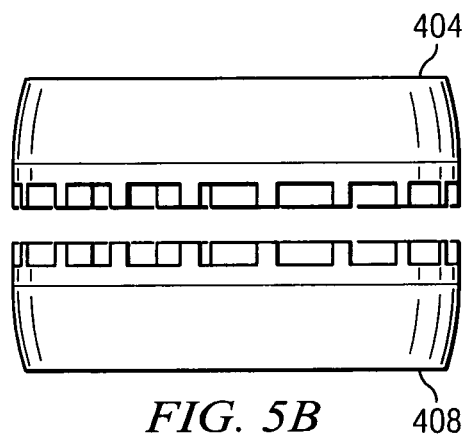
FIG. 5B shows top and bottom sections of the air dispensing assembly aligned to direct cooling air in an approximately circumferential or tangential direction.
Figure 6:
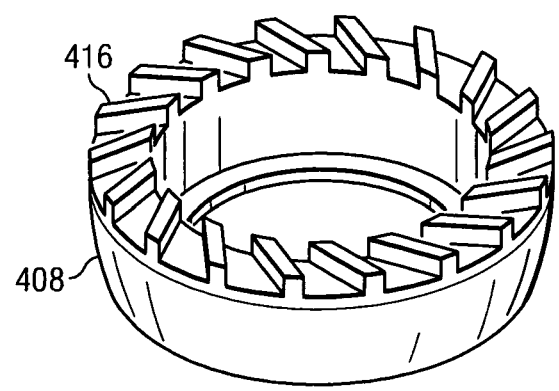
FIG. 6 shows a bottom section of the air dispensing assembly.
Figure 7:
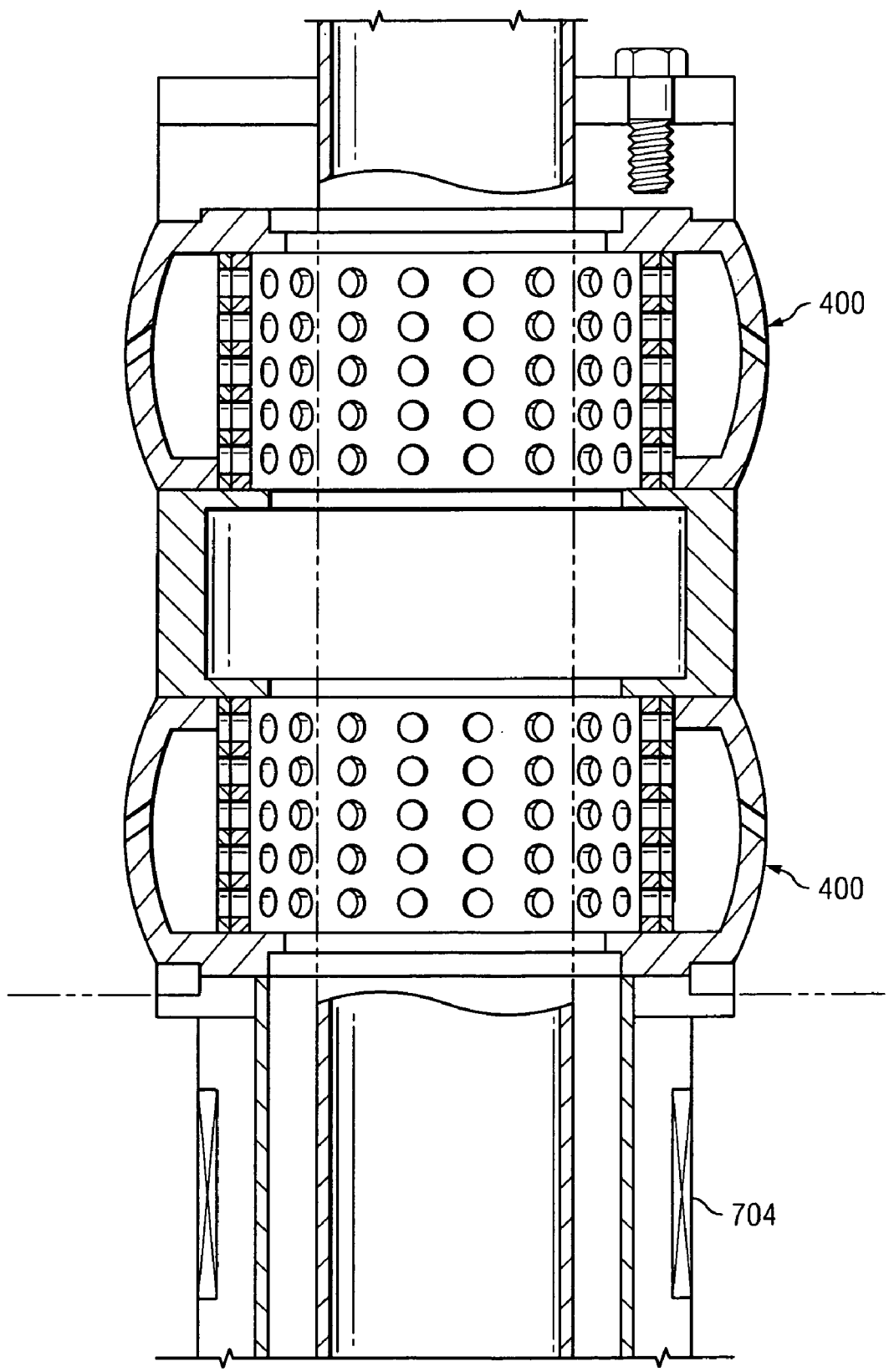
FIG. 7 shows two air dispensing assemblies stacked vertically.

FIG. 5B shows the top and bottom sections 404 and 408, respectively, aligned to direct cooling air in an approximately circumferential or tangential direction. As will be understood by those skilled in the art, the alignment of the top and bottom sections 404 and 408 allow the cooling air to flow out in a circumferential or tangential direction. FIG. 6 shows the bottom section 408 of the assembly. As shown in FIG. 6, the teeth 416 are formed at an angle to direct the flow of air in a circumferential or tangential direction. FIG. 7 shows two assemblies 400 stacked vertically and fitted around a shaft 704. The shaft 704 houses an exhaust air shaft adapted to collect heated air and an inlet passage to carry cooling air.

It will be understood by those skilled in the art, that the apparatus and method discussed in the foregoing can be used to cool plastic film tube produced in any other processes in addition to the blown film process. It will be appreciated that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An apparatus for cooling a molten plastic film tube exiting a die outlet of an extrusion die, the molten plastic film tube moving vertically upward in a vertically extending tube path having a longitudinal axis, comprising:
   an inlet passage adapted to direct cooling air through the extrusion die to an interior of the plastic film tube,
   at least one air dispensing device coupled to the inlet passage, the at least one air dispensing device configured to receive the cooling air and to direct a flow of the cooling air out of the at least one air dispensing device in an approximately circumferential and a generally upward direction about the longitudinal axis generating a rotating flow of the cooling air along the longitudinal axis,
   wherein the rotating flow of the cooling air in the interior of the plastic film tube cools the plastic film tube and reduces impact on an inner surface of the plastic film tube, and
   wherein the at least one air dispensing device comprises:
   a top section having a first set of teeth;
   a bottom section having a second set of teeth;
   at least one intermediate section installed between the top section and the bottom section to direct the rotating flow of cooling air out of the at least one air dispensing device in an approximately circumferential and a generally upward direction about the longitudinal axis.

2. The apparatus of claim 1, wherein the first set of teeth and the second set of teeth are formed at a predetermined angle with respect to a perimeter of the at least one air dispensing device to direct the flow of cooling air in an approximately circumferential and a generally upward direction about the longitudinal axis.

3. The apparatus of claim 1, wherein the first set of teeth and the second set of teeth are formed at a predetermined angle suitable to entrain the flow of cooling air across an external edge of the first set of teeth and the second set of teeth.

4. The apparatus of claim 1, wherein the top section, the bottom section, and the at least one intermediate section fit around an air shaft of the molten plastic film tube.

5. The apparatus of claim 1, wherein the at least one intermediate section maintains a gap between the first set of teeth and a second set of teeth.

6. The apparatus of claim 1, wherein the at least one intermediate section forms an opening at a perimeter of the at least one air dispensing device.

7. The apparatus of claim 1, wherein the at least one intermediate section comprises a plurality of openings allowing the flow of cooling air to flow out of the at least one intermediate section.

8. An apparatus for cooling a molten plastic film tube exiting a die outlet of an extrusion die, the molten plastic film tube expanding to its final diameter and moving vertically upward in a vertically extending tube path having a longitudinal axis, comprising:
   an inlet passage adapted to direct cooling air through the extrusion die to an interior of the plastic film tube; and
   at least one air dispensing device placed inside the plastic film tube and coupled to the inlet passage, the at least one air dispensing device configured to receive the cooling air and to direct a flow of the cooling air out of the at least one air dispensing device at an upward angle about the longitudinal axis generating a rotating flow of the cooling air along the longitudinal axis,
   wherein the rotating flow of the cooling air inside the plastic film tube cools the plastic film tube and reduces impact on an inner surface of the plastic film tube, and
   wherein the at least one air dispensing device comprises:
   a first section comprising a first set of teeth;
   a second section comprising a second set of teeth;
   at least one third section disposed between the first section and the second section.

9. The apparatus of claim 8, wherein the at least one third section maintains a gap between the first set of teeth and the second set of teeth and forms an opening at a perimeter of the at least one air dispensing device.

10. The apparatus of claim 8, wherein the first set of teeth and the second set of teeth are formed at a predetermined angle with respect to the perimeter of the at least one air dispensing assembly to direct the flow of cooling air at the upward angle about the longitudinal axis.

11. The apparatus of claim 8, wherein the at least one third section comprising at least one opening.

12. The apparatus of claim 11, wherein the at least one opening is configured to the flow of cooling air to flow out of the at least one air dispensing device.

13. The apparatus of claim 8, wherein a first air dispensing device of the at least one air dispensing device is disposed over the second air dispensing device of the at least one air dispensing device.

14. The apparatus of claim 8, wherein the first section, the second section, and the at least third section fit around an air shaft of the molten plastic film tube.

* * * * *